US012764712B2

(12) United States Patent
Zhang et al.

(10) Patent No.: US 12,764,712 B2
(45) Date of Patent: Oct. 13, 2026

(54) DETECTION MECHANISM FOR MAGNETIC DISTORTION

(71) Applicant: HEWLETT PACKARD ENTERPRISE DEVELOPMENT LP, Spring, TX (US)

(72) Inventors: Hongli Zhang, Beijing (CN); Hailong Bai, Beijing (CN); Kuanyue Li, Beijing (CN)

(73) Assignee: Hewlett Packard Enterprise Development LP, Spring, TX (US)

( * ) Notice: Subject to any disclaimer, the term of this patent is extended or adjusted under 35 U.S.C. 154(b) by 246 days.

(21) Appl. No.: 18/619,592

(22) Filed: Mar. 28, 2024

(65) Prior Publication Data

US 2025/0310932 A1 Oct. 2, 2025

(51) Int. Cl.

*H04W 64/00* (2009.01)
*H04W 4/02* (2018.01)
*H04W 4/029* (2018.01)

(52) U.S. Cl.

CPC ......... *H04W 64/003* (2013.01); *H04W 4/026* (2013.01); *H04W 4/029* (2018.02); *H04W 64/006* (2013.01)

(58) Field of Classification Search

CPC ... H04W 64/003; H04W 4/026; H04W 4/029; H04W 64/006

See application file for complete search history.

(56) References Cited

U.S. PATENT DOCUMENTS

| | | | | |
|---|---|---|---|---|
| 10,072,956 B2 * | 9/2018 | Zheng | .................... | G01D 18/00 |
| 10,132,829 B2 * | 11/2018 | Zheng | ..................... | G01P 21/00 |
| 10,422,640 B2 * | 9/2019 | Annen | .................. | G01C 17/28 |
| 12,238,673 B1 * | 2/2025 | Bahr | .................. | H04W 64/003 |
| 2016/0011022 A1 * | 1/2016 | Zheng | .................... | G01D 18/00 702/94 |

(Continued)

OTHER PUBLICATIONS

Yadav et al., "Accurate Orientation Estimation Using AHRS under Conditions of Magnetic Distortion", 2014, 12 pages.

(Continued)

*Primary Examiner* — Fayyaz Alam

(74) *Attorney, Agent, or Firm* — Hewlett Packard Enterprise Patent Department

(57) ABSTRACT

In implementations of the present disclosure, a detection mechanism for magnetic distortion is provided. An access point (AP) obtains a reference inclination value and a reference intensity value of a magnetic field intensity based on a location of the AP, and obtains an inclination value and an intensity value of the magnetic field intensity. The AP determines a first difference between the reference inclination value and the inclination value, and a second difference between the reference intensity value and the intensity value, and determines that the first difference exceeds a first threshold or the second difference exceeds a second threshold. The AP detects, based on the first difference exceeding the first threshold or the second difference exceeding the second threshold, a distortion for at least one of the inclination value and the intensity value. Implementations of the present disclosure can improve the accuracy of the detection of the magnetic distortion.

18 Claims, 8 Drawing Sheets

(56) References Cited

U.S. PATENT DOCUMENTS

| | | | | |
|---|---|---|---|---|
| 2022/0003797 | A1* | 1/2022 | Ramalho Ferreira | A63B 24/0003 |
| 2024/0142547 | A1* | 5/2024 | Anderson | G01R 33/0023 |

OTHER PUBLICATIONS

Aruba, "Online Detection of Magnetic Field Distortion for Both Indoor and Outdoor Directionality Application With Magnetometer", Sep. 2023, 14 Pages.

* cited by examiner

DETECTION MECHANISM FOR MAGNETIC DISTORTION

BACKGROUND

Magnetic distortion refers to deviations or changes in the Earth's magnetic field in certain regions or under specific conditions, compared to normal or expected magnetic patterns. The magnetic distortion can be caused by various factors, such as the geological structure within the Earth, the space environment outside the Earth, and the human factors. Uneven distributions of magnetic materials, geological structural changes, and magmatic activities within the Earth can lead to local anomalies in the Earth's magnetic field. Additionally, the space environment outside the Earth, such as solar winds and currents in the Earth's magnetosphere, can also affect the Earth's magnetic field. Further, human factors can also interfere with the Earth's magnetic field. For example, power lines, large metal structures, and military activities may cause local magnetic fields that interfere with the normal distribution of the Earth's magnetic field.

In the field of Wi-Fi, an access point (AP) with one or more directional antennas are widely used for better transmission performance. The directional antenna radiates within a certain angular range in the horizontal pattern. This means that under the same transmit power, directional antennas have longer transmission distances. However, it can only receive signals from specific directions. Therefore, when using a directional antenna, the direction of the signal needs to be known in advance. Therefore, it is important to know whether the magnetic value associated with an AP is accurate or not.

BRIEF DESCRIPTION OF THE DRAWINGS

Implementations of the present disclosure may be understood from the following Detailed Description when read with the accompanying figures. In accordance with the standard practice in the industry, various features are not drawn to scale. In fact, the dimensions of the various features may be arbitrarily increased or reduced for clarity of discussion. Some examples of the present disclosure are described with reference to the following figures.

DETAILED DESCRIPTION

Figure 1:
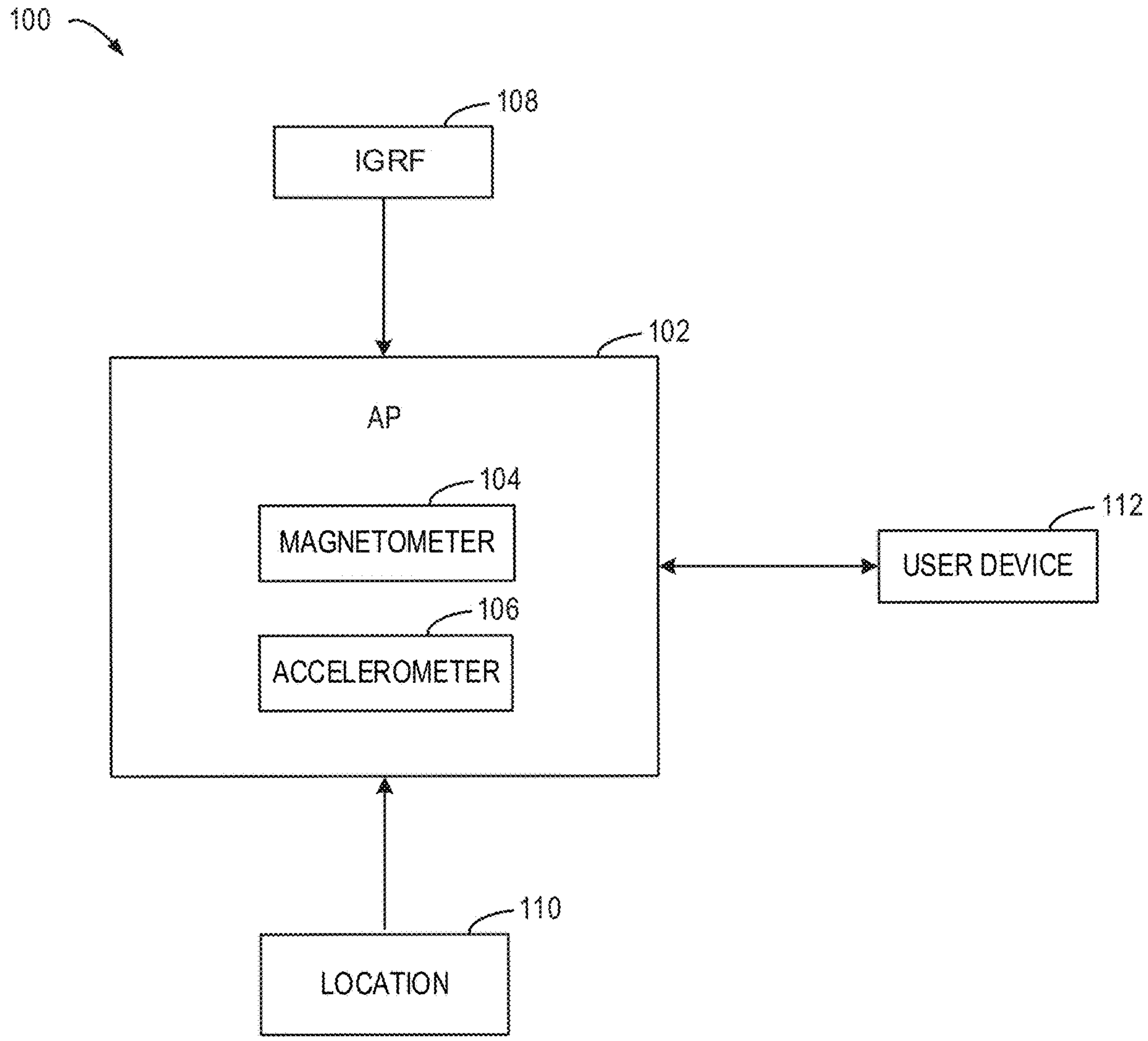
FIG. 1 illustrates an example network environment in which example implementations of the present disclosure may be implemented.

Wi-Fi is a wireless networking technology that uses radio waves to provide wireless high-speed Internet access. Wi-Fi 7 (IEEE 802.11be) is a most recent Wi-Fi standard, which can improve the wireless experience and accelerate emerging use cases. The use cases of Wi-Fi may include low-latency extended reality (XR), social cloud-based gaming, 8K video streaming, and simultaneous video conferencing and casting. Wi-Fi 7 solutions can enhance speed, latency, and network capacity plus support for advanced features like 320 megahertz (MHz) channels, 4K quadrature amplitude modulation (QAM), and advanced multi-link implementations such as high band simultaneous multi-link. Wi-Fi 7 can enable significantly faster speeds by packing more data into each transmission. 320 MHz channels are twice the size of previous Wi-Fi generations. Compared to 1K QAM with Wi-Fi 6/6E, 4K QAM can enable each signal to embed a greater amount of data more densely. Wi-Fi 7 increases the maximum available bandwidth to 320 MHz on the 6 gigahertz (GHz) band. The wider 320 MHz channels provided by Wi-Fi 7 allow more data to be transmitted via an access point (AP).

Therefore, to achieve better coverage and high speed, directional antennas are used more and more for APs. The directional antennas can enhance signal strength and transmission distance. The directional antennas can concentrate their radiated energy within a specific beam, thereby boosting signal strength. Compared to omnidirectional antennas, directional antennas are more capable of transmitting and receiving signals over long distances in a particular direction, making them suitable for scenarios that require long-range transmission. The directional antennas can reduce interferences. The directional antennas have negligible radiation intensity outside their beam width, helping to minimize interference from surrounding nodes during transmission. Furthermore, by intelligently adjusting antenna elements and arrangement patterns, directional antennas can reduce interferences and improve the signal-to-noise ratio, thus enhancing the quality and reliability of the whole communication system. Moreover, the directional antennas can improve the security level and have better network optimization and flexibility.

As discussed above, the direction of the signals to be transmitted from an AP and the signals to be received by the AP need to be known in advance. Thus, it is important to know whether the magnetic value at the place where the AP is located is accurate or not. Some AP solutions or products can provide a smart antenna module (SAM). The SAM can report the directionality of the antennas by the innovative design of transparent inter-integrated circuit (IIC) bus and power for antenna. In some implementations, the SAM can comprise a three-dimensional (3D) micro-electro-mechanical system (MEMS) magnetometer and a 3D MEMS accelerometer. By using the 3D magnetometer and the 3D MEMS accelerometer, the SAM can report yaw, pitch, roll angles, inclination values, and intensity values by monitoring gravity and the Earth's magnetic field.

The Earth's magnetic field can experience local distortion because of the nearby presence of ferrous and/or magnetic objects, and thus, they may also affect the yaw angle. This magnetic distortion makes the AP insufficient for use in some adverse circumstances. For example, the accuracy of the yaw angles may be affected. It may be unknown for an AP whether the reported or detected magnetic values have magnetic distortions or not. Hence, the AP does not know if its directional antenna is aligned with the directions of the signals to be transmitted or received. Therefore, implementations of the present disclosure propose a detection mechanism for magnetic distortion. One of the concepts of the detection mechanism is to detect both long-term/static magnetic distortion, and report any errors. In some implementations, another concept of the detection mechanism is to detect short-term magnetic distortion to correct the yaw angle.

According to implementations of the present disclosure, an AP obtains a reference inclination value and a reference intensity value of a magnetic field intensity based on the location of the AP. The AP obtains, using a magnetometer and an accelerometer of the AP, an inclination value and an intensity value of the magnetic field intensity associated with the AP. The AP determines a first difference between the reference inclination value and the inclination value associated with the AP, and a second difference between the reference intensity value and the intensity value associated with the AP. The AP determines whether the first difference exceeds a first threshold or the second difference exceeds a second threshold. In the event that the first difference exceeds the first threshold or the second difference exceeds the second threshold, the AP detects a distortion for at least one of the inclination value and the intensity value.

Implementations of the present disclosure introduce both Inclination and intensity to cover more distortion scenarios. It can improve the accuracy of the detection of the magnetic distortion and save on the cost of detecting the magnetic distortion. Implementations of the present disclosure can correct the azimuth of the antenna to achieve a better transmission performance.

The advantages of implementations of the present disclosure will be described with reference to example implementations as described below. Reference is made below to FIG. 1 through FIG. 8 to illustrate basic principles and several example implementations of the present disclosure herein.

Reference is made to FIG. 1, which illustrates an example network environment 100 in which example implementations of the present disclosure may be implemented. As shown in FIG. 1, the example network environment 100 may comprise an AP 102 and a user device 112. The AP 102 may comprise a 3D magnetometer 104. The AP 102 may further comprise a 3D MEMS accelerometer 106. The 3D magnetometer 104 and the 3D MEMS accelerometer 106 are used to provide the yaw, pitch, roll angles, inclination values, and the intensity values associated with the AP 102 (for example, associated with the location of the AP 102). The MEMS is a technology that in its most general form can be defined as miniaturized mechanical and electro-mechanical elements. The MEMS device typically converts a measured mechanical signal into an electrical signal. The MEMS accelerometer is smaller and cheaper than a gyroscope. The 3D magnetometer performs better than a compass.

In some implementations (not shown), the AP 102 may comprise a SAM comprising the 3D magnetometer 104 and the 3D MEMS accelerometer 106. The SAM can detect the yaw, pitch, roll angles, inclination values and the intensity values, and report the same to the AP 102. It is to be understood that the discussions of the present disclosure may comprise both implementations.

The AP 102 may obtain its location 110. For example, the AP 102 is outdoor, it may determine its location by a global navigation satellite system (GNSS) sensor. The GNSS sensor may be mounted or attached to or nearby the AP 102. The GNSS sensor can receive signals for positioning and derive its position from the signals for positioning. The signals for positioning may be received from the Global Positioning System (GPS), Global Navigation Satellite System (GLONASS), Galileo Satellite Navigation System, and/or Beidou Navigation Satellite System. The determined location may be represented as a coordinate comprising a corresponding latitude and longitude. In some implementations, the coordinate may further comprise a corresponding altitude.

After the AP 102 obtains its location, it may check the reference inclination value and the intensity value based on the location and the current date. For example, the AP 102 may obtain the reference inclination value and the intensity value from a table of an international geomagnetic reference field (IGRF) 108 corresponding to the current date. This is because the table of the IGRF 108 may vary from different dates, so the current date is considered for determining the reference inclination value and the intensity value.

The IGRF 108 is an internationally recognized mathematical model of the Earth's main magnetic field. It is widely used in research on the Earth's deep structure, crust, ionosphere, and magnetosphere. The IGRF 108 provides a standardized approach to understanding and predicting the behavior of the Earth's magnetic field, making it crucial for various earth science studies and applications such as navigation, geological exploration, and space science. The IGRF 108's model is developed and maintained by the geomagnetism working group of the International Association of Geomagnetism and Aeronomy (IAGA).

Usually, the IGRF is updated every five years. The most recent, e.g., the 13th generation release of the IGRF, was created in 2019. The current IGRF describes the Earth's magnetic field from 1900 to 2025. Currently, the IGRF is a spherical harmonic degree 13 model, with maximum harmonic degree 8 for the SV component. In general, the IGRF provides information about the locations of the magnetic poles and is a basis for geomagnetic coordinate systems.

Accordingly, the AP 102 may send a request for checking the inclination value and the intensity value based on its location and the current date. According to the most recent generation release of the IGRF, the AP 102 may determine the responded inclination value and the responded intensity value as the reference inclination value and the reference intensity value.

After the AP 102 obtains the inclination value and the intensity value at the location of the AP 102 and obtains the reference inclination value and the reference intensity value, the AP 102 may compare the inclination value with the reference inclination value. The AP 102 may also compare the intensity value and the reference intensity value.

If the difference value (also referred to as the first difference) between the inclination value with the reference inclination value is greater than a threshold inclination value (also referred to as the first threshold), the AP 102 may decide that a distortion for the inclination value is detected. Similarly, if the difference value (also referred to as the second difference) between the intensity value with the reference intensity value is greater than a threshold intensity value (also referred to as the second threshold), the AP 102 may decide that a distortion for the intensity value is detected. In general, the distortion for the inclination value and the distortion for the intensity value can be collectively or independently referred to as the magnetic distortion.

If the AP 102 detects the magnetic distortion, it may report the magnetic distortion to the user device 112. The user device 112 may be a client using the AP, or a service provider for managing the AP. The user device 112 may be in any form without limitations.

If the AP 102 detects the magnetic distortion, it may correct the yaw angle to be used for the directional antennas. For example, the AP 102 may ignore the measured the yaw angle (also referred to as the azimuth). The AP 102 may use a previous azimuth determined when there is no distortion.

It is to be understood that in FIG. 1 and throughout the present disclosure, the number of any elements is only for the purpose of illustration without suggesting any limitations. The network environment 100 may comprise more or fewer APs, magnetometers, accelerometers, SAMs, and/or user devices.

Figure 2:
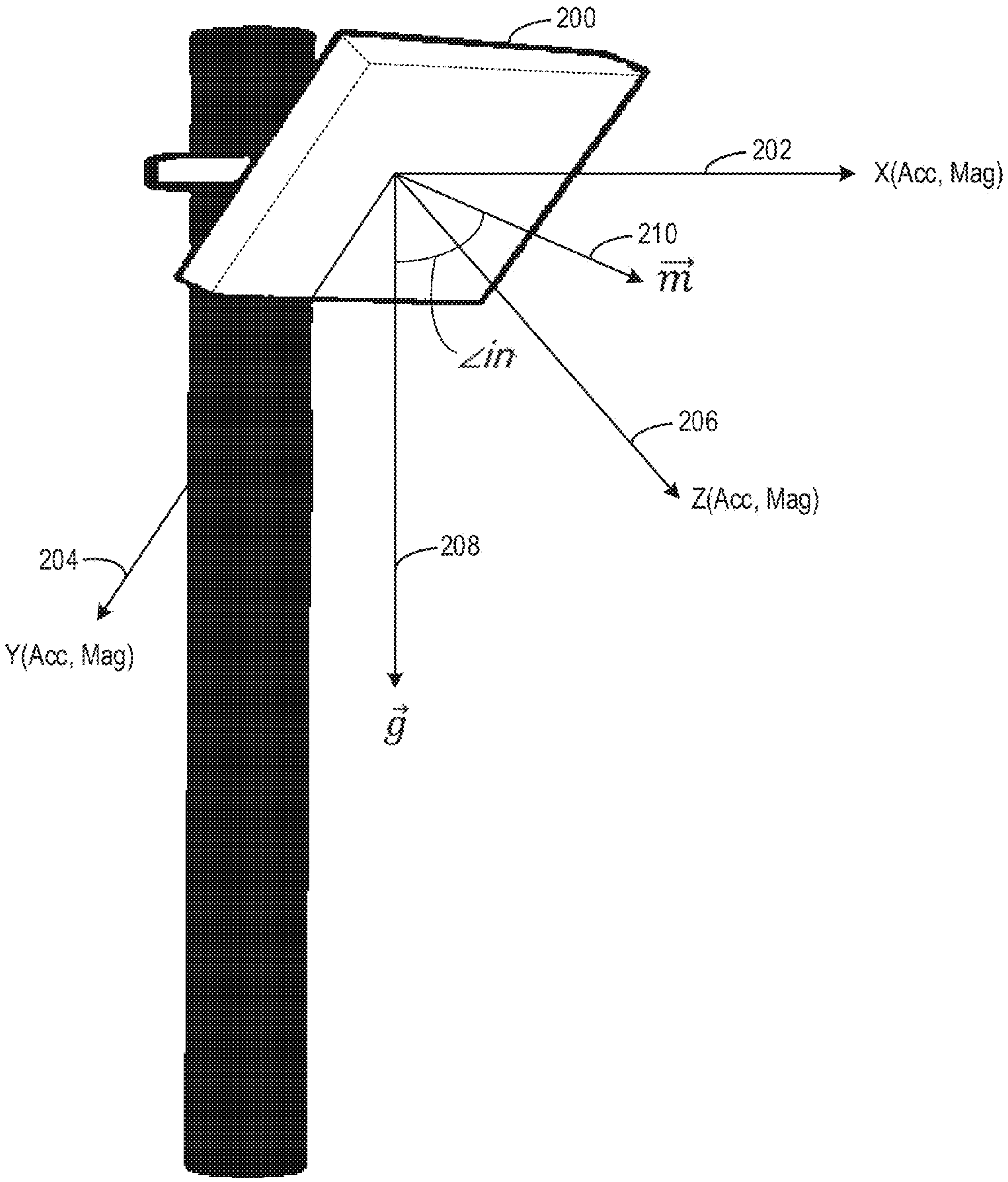
FIG. 2 illustrates an example illustration of a directional antenna according to implementations of the present disclosure.

For the purpose of better understanding the solutions of the present disclosure, several useful concepts will be described in advance with reference to FIG. 2 to FIG. 5 thereinafter. Reference is made to FIG. 2, which illustrates an example illustration of a directional antenna 200 according to implementations of the present disclosure.

As shown in FIG. 2, the directional antenna 200 is mounted on a pole with a certain inclination. X(Acc, Mag), Y(Acc, Mag), and Z(Acc, Mag) are the 3D axes of the MEMS accelerometer and magnetometer, respectively. For example, the axis of X(Acc, Mag) may be represented by the arrow 202. The axis of Y(Acc, Mag) may be represented by the arrow 204. The axis of Z(Acc, Mag) may be represented by the arrow 206.

The vector $\vec{g}$ may be the vector of the gravity, which may be represented by the arrow 208. The vector $\vec{m}$ may be the vector of the magnetic field, which may be represented by the arrow 210. The directional antenna 200's normal direction may be the same as the Z(Acc, Mag). The pitch angle of the directional antenna 200 may be the angle of the $\vec{g}$ with the XY plane (the plane consisting of the X axis and Y axis). The roll angle of the directional antenna 200 may be the angle of the $\vec{g}$ with the YZ plane. The yaw (azimuth) angle of the directional antenna 200 may be the angle of the Z(Acc, Mag) with the $\vec{g}$-$\vec{m}$ plane.

Figure 3:
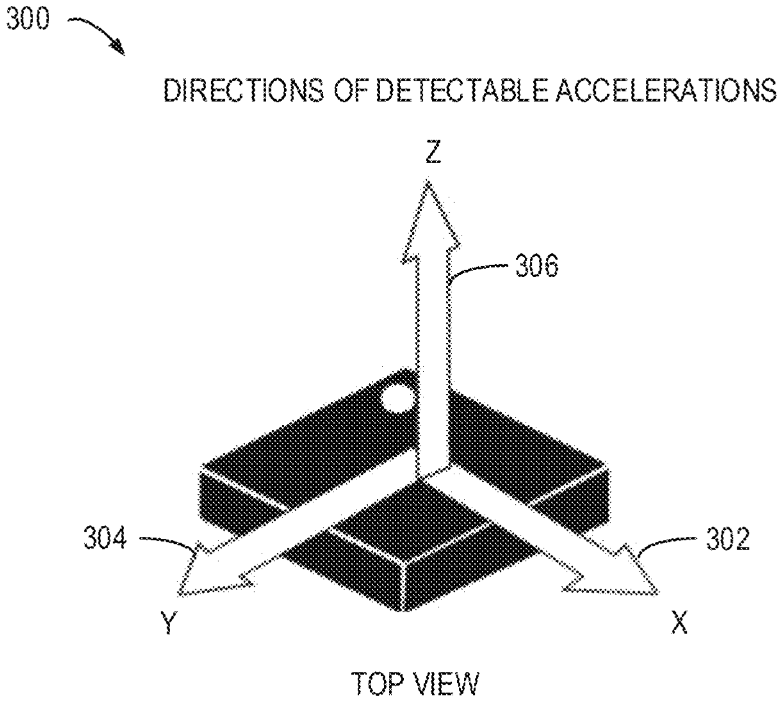
FIG. 3 illustrates an example illustration of directions of detectable accelerations according to implementations of the present disclosure.

Reference is made to FIG. 3, which illustrates an example illustration of directions of detectable accelerations 300 according to implementations of the present disclosure. FIG. 3 shows the directions of detectable accelerations 300 from a top view. the three axes XYZ represent the three orthogonal directions in 3D space. These three axes are perpendicular to each other, forming a rectangular coordinate system. For example, the X axis may be represented as the arrow 302, the Y axis may be represented as the arrow 304, and the Y axis may be represented as the arrow 306. As shown, the axes XYZ are perpendicular to each other.

Usually, the X axis and Y axis are usually located on the horizontal plane, while the Z axis is perpendicular to the horizontal plane. The Z axis may be perpendicular to the surface of a directional antenna (which is the XY plane).

When an object (such as the directional antenna) moves in 3D space, its acceleration components in each axis can be measured and analyzed independently. The acceleration components on these three axes are relative, and together they describe the motion state of the object in 3D space. For example, the acceleration of an object can have a component on the X axis, as well as components on the Y-axis and Z axis. The magnitude and direction of these components together determine the acceleration vector of the object in three-dimensional space.

In some example implementations, the inclination value and intensity value can be determined in the following manner. As shown in FIG. 2, ∠in is the inclination of magnetic field in current location. $\vec{g}$=(Xa, Ya, Za) is the reading of the 3D accelerometer, and $\vec{m}$=(Xm, Ym, Zm) is the reading of the 3D magnetometer. The inclination value of magnetic field can be derived from equation (1).

$$\cos \angle in = \frac{\vec{m} \cdot \vec{g}}{|\vec{m}| * |\vec{g}|} \tag{1}$$

where $|\vec{m}|$ is the is the magnitude/norm of vector $\vec{m}$, and $|\vec{g}|$ is the magnitude/norm of vector $\vec{g}$. The magnitude of a vector in 3D space is just the square root of the sum of the squares of the x, y, z components of that vector. The symbol "•" represents a dot product.

By using the inverse cosine function, the angle between the vectors $\vec{m}$ and $\vec{g}$ can be determined. In some example implementations, $|\vec{m}|$ may also be the magnetic field intensity of the current location.

As shown in FIG. 3, the directional antenna may be a flat antenna, and the Z axis may be perpendicular to the surface of the directional antenna. However, this is only an illustrative example without limitations. Other types of antenna may also be applicable to the solutions of the present disclosure.

Figure 4:
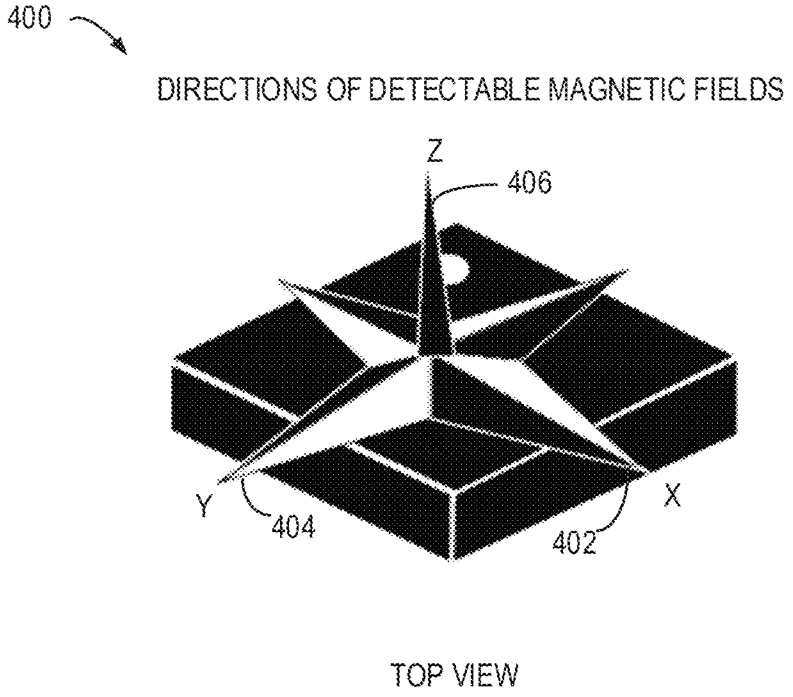
FIG. 4 illustrates an example illustration of directions of detectable magnetic fields according to implementations of the present disclosure.

Reference is made to FIG. 4, which illustrates an example illustration of directions of detectable magnetic fields 400 according to implementations of the present disclosure. FIG. 4 shows the directions of the magnetic fields 400 in a geomagnetic coordinate system from a top view. Generally, the geomagnetic coordinate system may be a coordinate system commonly used on the earth's surface. It is a coordinate system based on the earth's magnetic field.

In the geomagnetic coordinate system, the origin may be usually located at the observation point, and the vertical plane where the magnetic field value is located is the magnetic meridian. The specific parameters of the geomagnetic coordinate system include the positive X axis, which may be north of the geographical meridian, the positive Y axis, which may be east of the latitude, and the positive Z axis, which may be vertically downward. For example, the X axis may be represented as the arrow 402, and the Y axis may be represented as the arrow 404, and Y axis may be represented as the arrow 406. As shown, the axes XYZ are perpendicular to each other. It is to be noted that since the Earth's magnetic field is changing, especially affected by factors such as solar activity, the parameters of the geomagnetic coordinate system will also change over time.

Figure 5:
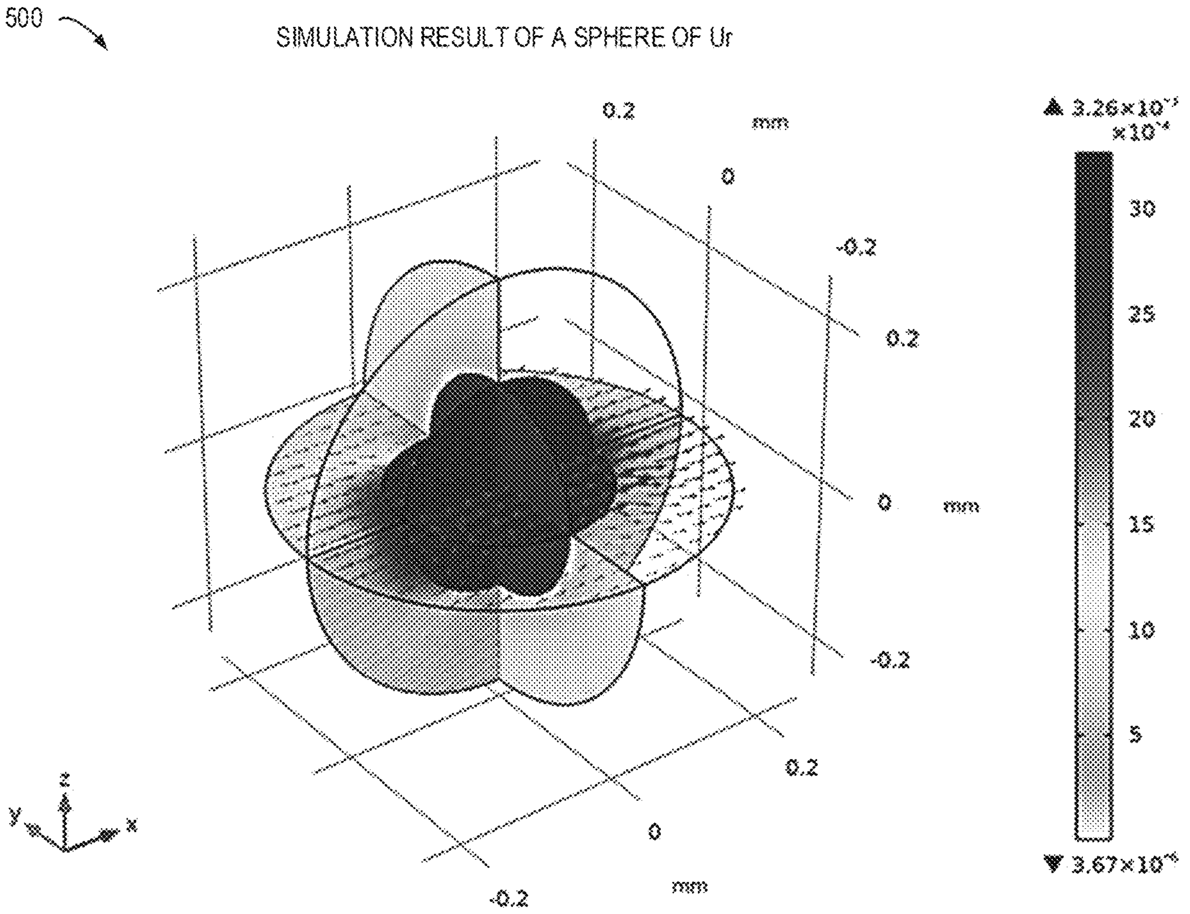
FIG. 5 illustrates an example simulation result of a sphere of Ur according to implementations of the present disclosure.

Reference is made to FIG. 5, which illustrates an example simulation result 500 of a sphere of Ur according to implementations of the present disclosure. FIG. 5 shows the simulation result 500 that a sphere of Ur (relative permeability)=1000 is exposed to a spatially uniform static background magnetic field of strength 1 mT. The magnetic field is distorted close to the sphere, both the direction and the intensity. The simulation result 500 shows the magnetic flux density varying over the volume and distance.

In conclusion, the Ur, the volume and the distance are the three key parameters. A higher Ur, a larger volume, and a shorter distance will cause a larger magnetic field distortion. Different materials may have different relative permeability, which is shown in Table 1 as an example.

TABLE 1

| Material and relative permeability | |
|---|---|
| Material | Relative Permeability μ/μ0 |
| Iron (99.95% pure Fe annealed in H) | 200000 |
| Ferritic stainless steel (annealed) | 1000-1800 |
| Ferrite | 350-500 |
| Ferrite (cobalt nickel zinc) | 40-125 |
| Carbon steel | 100 |
| Austenitic stainless steel | 1.003-1.05 |
| Neodymium magnet | 1.05 |
| Platinum | 1.000265 |
| Aluminum | 1.000022 |
| Concrete (dry) | 1 |
| Vacuum | 1 |

Hence, it can be seen that there are some factors which may affect the local magnetic field. For example, Iron ore, steel concrete buildings, iron utility poles that are close to the magnetometer, can severely distort the Earth's magnetic field, and thus leading to the increased azimuthal (yaw) measurement errors.

After discussing the aforementioned concepts with reference in combination with FIG. 2 to FIG. 5, reference will be made to FIG. 6, which illustrates an example flow chart of an example process 600 for determining a distortion and a yaw correction according to implementations of the present disclosure. The process 600 may be implemented by an AP, for example, the AP 102 as shown in FIG. 1. Therefore, for the purpose of clarity, the description of FIG. 6 will be made in combination with FIG. 1 thereinafter.

At 602, the AP 102 may obtain its location from a GNSS sensor or a location service provider. As an example, if the AP 102 is outdoor, the AP 102 may obtain its location 110 from a GNSS sensor which is attached or mounted nearby the AP 102. As another example, if the AP 102 is indoor while the GNSS sensor which is attached or mounted to the AP 102 is outdoor, the AP 102 may also obtain its location 110 from the GNSS sensor.

As a further example, if the AP 102 is indoor, the AP 102 may obtain its location 110 from the location service provider. An example of the location service provider may be an open location service. The open location service can support an industry standard for sharing location information of APs to other devices. The open location service can enable new innovations in indoor location-based services for APs, such as Wi-Fi 6 and Wi-Fi 7 APs. The open location service can use fine timing measurement and intelligent software combinations supported by the Wi-Fi positioning feature to enable highly accurate automated indoor positioning. The precise location of the WLAN infrastructure where the AP is deployed can be leveraged to create a reference point by using the open locate service.

The open locate service can achieve self-positioning for indoor APs. The indoor access points can support fine timing measurements (FTM) APs to achieve the self-positioning. The open locate service can provide indoor device positioning data with meter-level accuracy. Networks and devices that support the open locate service can work together with Wi-Fi network connections and provide accurate location information without the need to deploy a separate, internet-based network infrastructure. The open locate service can also eliminate expensive maintenance costs. The open locate service may be based on the FTM protocol and uses ranging to locate devices in the network.

At 604, after the AP 102 obtains its location 110. The AP 102 may transmit a request to check the most recent IGRF table. For example, the AP 102 may first determine today's date and determine that the corresponding IGRF table may be the $13^{th}$ generation release. Then the AP 102 may check the $13^{th}$ generation release of the IGRF table to obtain the corresponding inclination value and intensity value based on its latitude and longitude comprised in its location information. The AP 102 may determine the obtained inclination value and the intensity value as the reference inclination value (may also be referred to as $I_{ref}$ thereinafter) and the reference intensity value (may also be referred to as $F_{ref}$ thereinafter).

At 606, the AP 102 may compare the inclination value (may also be referred to as I thereinafter) obtained based on 608 with the reference inclination value $I_{ref}$. The AP 102 may also compare the reference intensity value $F_{ref}$ with the intensity value (may also be referred to as F thereinafter) obtained based on 608. At 608, the AP 102 may use the magnetometer 104 and the accelerometer 106 of the AP 102 to obtain the measured inclination value I and the measured intensity value F of the magnetic field intensity associated with the AP 102. In some implementations, the AP 102 may comprise a SAM which can report the measured inclination value and the intensity value of the magnetic field intensity directly.

The AP 102 may compare the reference inclination value $I_{ref}$ and the inclination value I. The AP 102 may also compare the reference intensity value $F_{ref}$ and the intensity value F in parallel or sequentially. If the different between the inclination value I and the reference inclination value $I_{ref}$ is greater than a threshold inclination value (may also be referred to as $\sigma_I$ thereinafter), the process may continue to 612. If the different between the inclination value I and the reference inclination value $I_{ref}$ is not greater than the threshold inclination value $\sigma_I$ the process may continue to 610.

If the different between the intensity value F and the reference intensity value $F_{ref}$ is greater than a threshold intensity value (may also be referred to $\sigma_F$ thereinafter), the process may continue to 612. If the different between the intensity value F and the reference intensity value $F_{ref}$ is not greater than the threshold inclination value $\sigma_F$ the process may continue to 610. The thresholds may be pre-defined by some tests in typical application scenarios, for example, indoor wall mount, outdoor pole mount, and rooftop mount.

At 610, the AP 102 may determine that there is no distortion for the inclination value and the intensity value. In some example implementations, the AP 102 may store the measured inclination value I and the measured intensity value Fin case that any distortion afterwards. If any distortion happens afterwards, the AP 102 may use an inclination value I and an intensity value F which is measured when there is no distortion. For example, the AP 102 may use the most recent stored inclination value I and the intensity value F.

The AP 102 may determine that a magnetic distortion happens based on either or both of the distortion for the inclination value and the distortion for the intensity value. That is, the condition to declare that the magnetic distortion is determined comprises the following: (1) the distortion for the inclination value happens; (2) the distortion for the intensity value; and (3) the distortion for the inclination value happens and the distortion for the intensity value happens.

At 612, the AP 102 may check whether this is the first time that the distortion for the inclination value and the intensity value is detected or not. If this is the first time that the distortion for the inclination value and the intensity value is detected, the process 600 may continue to 614. If this is not the first time that the distortion for the inclination value and the intensity value is detected, the process 600 may continue to 616. It is to be understood that the step 612 may only be an example. The step 612 can also be alternative or additional and thus can be omitted. Step 612 can be used to determine which inclination values and the intensity values are the inclination values and the intensity values measured when there is no magnetic distortion.

At 614, the AP 102 may determine that the magnetic distortion is detected. In some implementations, the AP 102 may report the detection of the magnetic distortion to the user device 112. The user device 112 and/or the AP 102 may record this event and may search for the most recent inclination values and the intensity values when there is no magnetic distortion.

At 616, the AP 102 may try to determine whether the AP 102 has been moved before the detection of the distortion or not. For example, at 618, the AP 102 may obtain an acceleration value (may also be referred to as Acc thereinafter) associated with the AP 102. The obtained acceleration value may be collected before the detection of the distortion from the accelerometer 106. The AP 102 may also obtain a reference acceleration (may also be referred to as $Acc_{ref}$ thereinafter) associated with the AP 102 in parallel or sequentially. For example, the reference acceleration A is predetermined and stored in the AP. The AP 102 may retrieve this reference acceleration $\sigma_A$ from the storage component.

The AP 102 may compare the acceleration value Acc and the reference acceleration $Acc_{ref}$. If the acceleration value Acc is greater than the reference acceleration $Acc_{ref}$, it means that the AP 102 has been moved. That is, there is a possibility that the AP 102 is unmounted and shipped to other places or mounted to other places, so the process 600 may not be applicable anymore, the AP 102 will not correct the yaw angle. If the acceleration value Acc is not greater than the reference acceleration $Acc_{ref}$, it means that the AP 102 has not been moved, so the process 600 may still be applicable, and the AP 102 will correct the yaw angle. Thus, if the acceleration value Acc is greater than the reference acceleration $Acc_{ref}$, the process may continue to 614. If the acceleration value Acc is not greater than the reference acceleration $Acc_{ref}$, the process may continue to 620.

At 620, the AP 102 may correct the yaw angle (which is also referred to as the azimuth). For example, the AP 102 may prevent from using the current yaw angle. Instead, the AP 102 may determine to use a previous azimuth determined when there is no magnetic distortion. If the AP 102 has been moved before the detection of the distortion, the AP 102 may determine to use the current azimuth.

In this way, the accuracy of the detection of the magnetic distortion can be improved, and the cost of detecting the magnetic distortion can be saved because the cost of MEMS accelerometers and magnetometer are much cheaper than the cost of gyroscopes. The size of the AP can also be reduced because the sizes of MEMS accelerometers and magnetometer are much smaller than the sizes of the gyroscope or north finder (or compass). In static magnetic distortion, the AP can prevent from reporting fault directionality. With some short-term magnetic distortion, the directionality of the AP can remain stable. Therefore, the directionality report is more reliable for the application of Auto Frequency Coordination (AFC), antenna heading, and antenna alignment. In some implementations, the azimuth of the antenna can be corrected such that a better transmission performance can be achieved.

Figure 7:
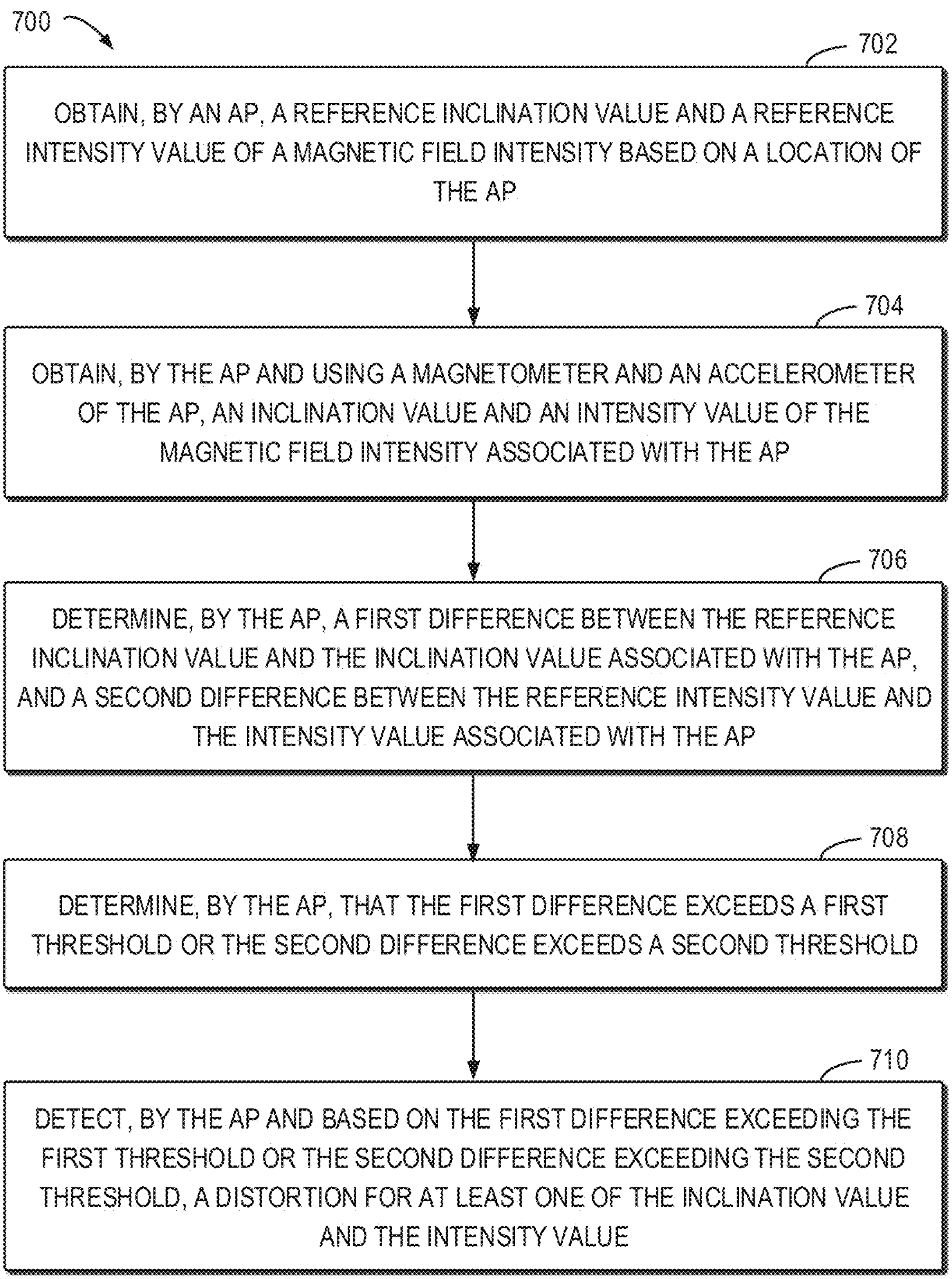
FIG. 7 illustrates an example flow chart of an example method for detecting a magnetic distortion according to implementations of the present disclosure.

Reference is made to FIG. 7, which illustrates an example flow chart of an example method 700 for detecting a magnetic distortion according to implementations of the present disclosure. The method 700 may be performed by an access point such as the AP 102 as shown in FIG. 1. Therefore, for the purpose of clarity, the description of FIG. 7 will be made in combination with FIG. 1 thereinafter.

At 702, the AP 102 obtains a reference inclination value and a reference intensity value of a magnetic field intensity based on the location 110 of the AP 102. For example, the AP 102 may check the most recent table of the IGRF 108 to obtain the reference inclination value and the reference intensity value. The location 110 may be obtained by the GNSS) sensor or from the location service provider such as the open locate service.

At 704, the AP 102 obtains an inclination value and an intensity value of the magnetic field intensity associated with the AP. For example, the AP 102 may use the magnetometer 104 and the accelerometer 106 of the AP 102. In some implementations, the AP 102 may obtain the inclination value and the intensity value from a SAM, which may be capable of outputting the inclination value and the intensity value directly.

At 706, the AP 102 determines a first difference between the reference inclination value associated with the AP 102 and the inclination value associated with the AP 102. The AP 102 also determines a second difference between the reference intensity value associated with the AP 102 and the intensity value associated with the AP 102.

At 708, the AP 102 determines that the first difference exceeds a first threshold or the second difference exceeds a second threshold. At 710, the AP 102 detects, based on the first difference exceeding the first threshold or the second difference exceeding the second threshold, a distortion for at least one of the inclination value and the intensity value.

As an example, the AP 102 may compare the reference inclination value and the inclination value. The AP 102 also may compare the reference intensity value and the intensity value. In the event that the first difference exceeds the first threshold or the second difference exceeds the second threshold, the AP 102 may detect the distortion for the inclination value and/or the distortion for the intensity value.

Figure 6:
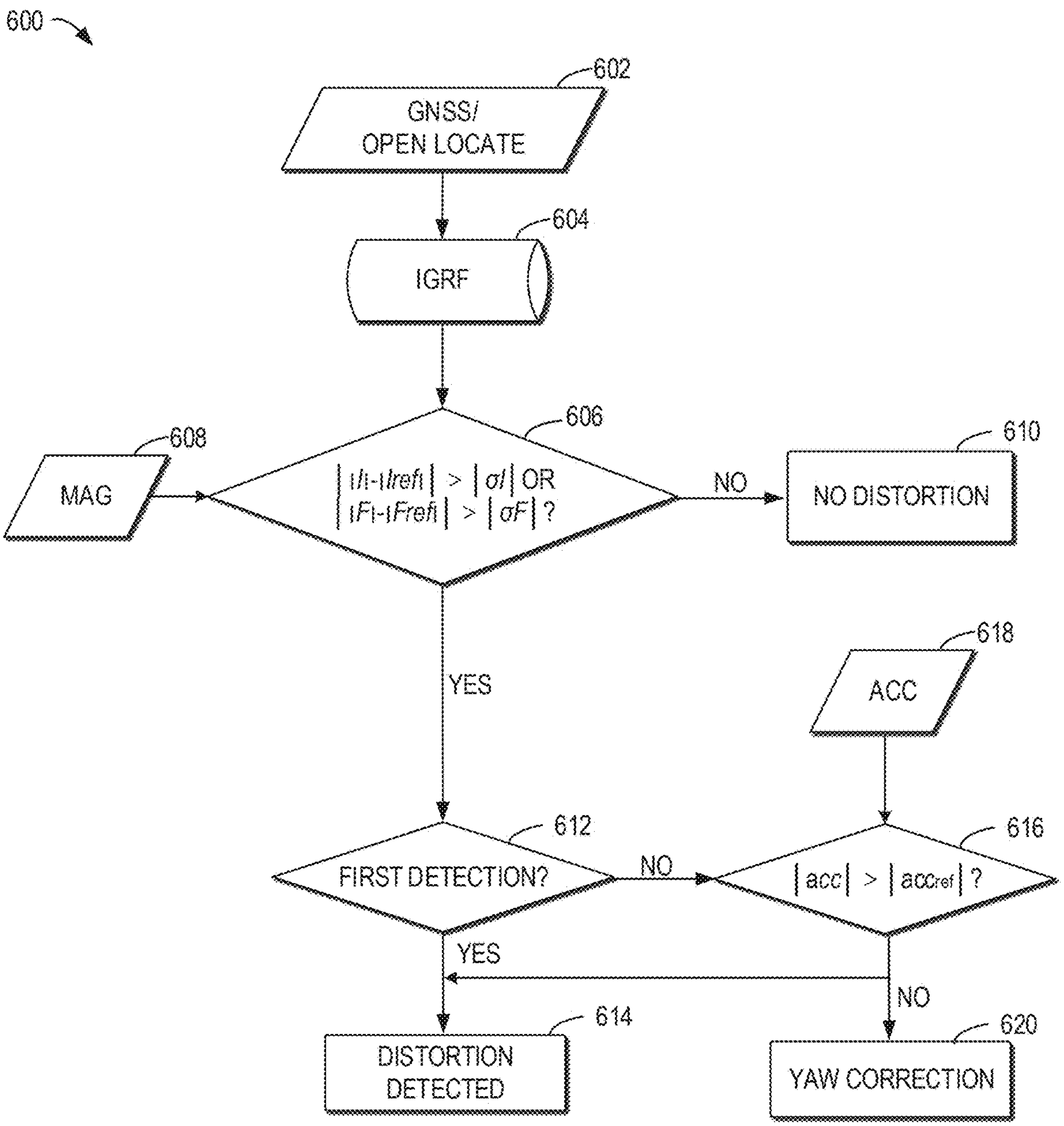
FIG. 6 illustrates an example flow chart of an example process for determining a distortion and a yaw correction according to implementations of the present disclosure.

It is to be understood that the method 700 may comprises other steps as described aforementioned with reference to FIG. 6. For example, the method 700 may further comprise the steps to determine whether the AP has been moved before the detection of the distortion. As another example, the method 700 may further comprise the steps to correct the yaw angle. For the purpose of simplification, these additional steps or alternative steps will not be described herein again.

In this way, the solution of the present disclosure can improve the accuracy of the detection of the magnetic distortion, while saving the cost for detecting the magnetic distortion. Some implementations of the present disclosure can correct the azimuth of the antenna such that a better transmission performance can be achieved.

Figure 8:
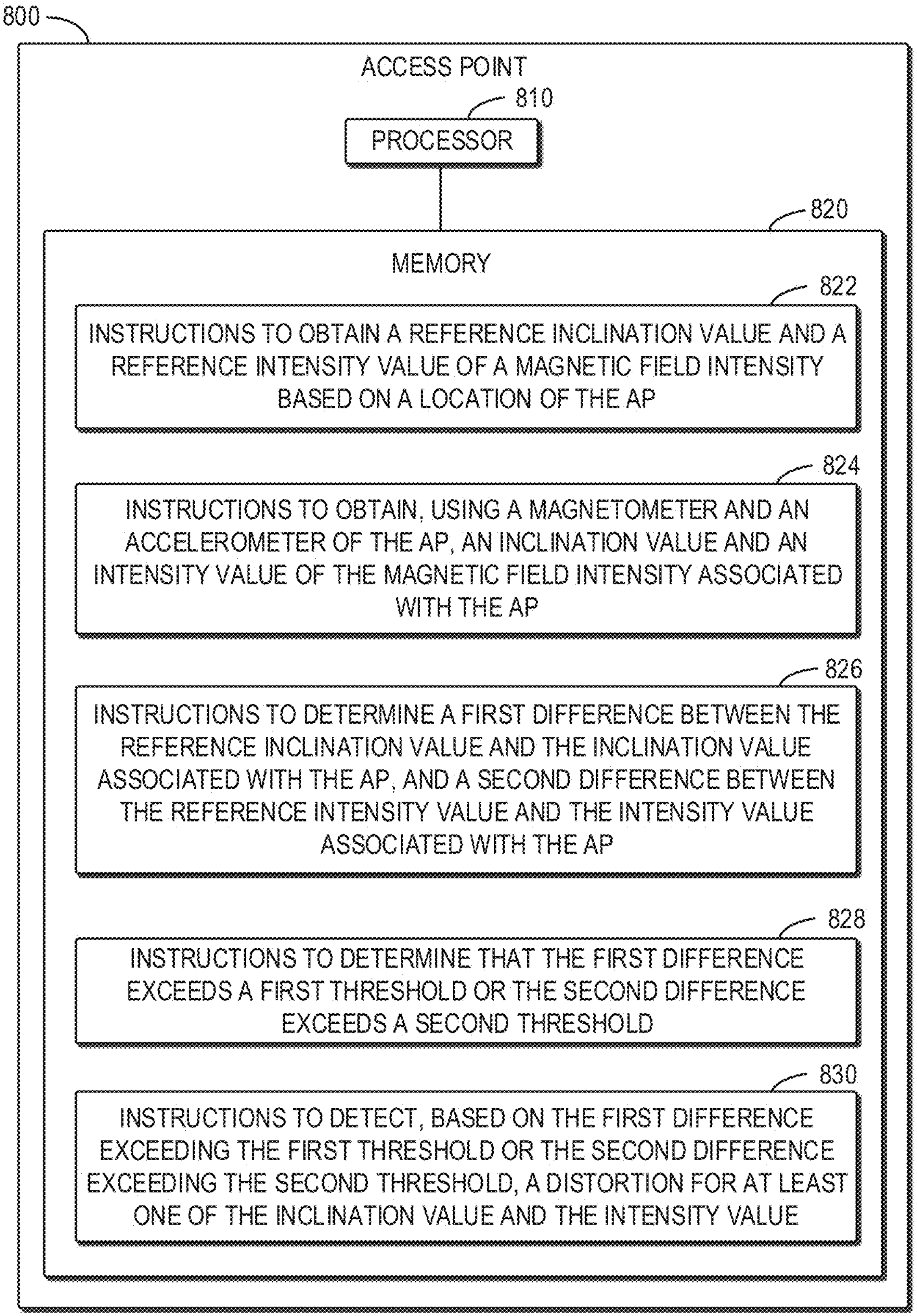
FIG. 8 illustrates an example AP according to implementations of the present disclosure.

Reference is made to FIG. 8, which illustrates an example AP 800 according to implementations of the present disclosure. As shown in FIG. 8, the AP 800 comprises at least one processor 810, and a memory 820 coupled to the at least one processor 810. The memory 820 stores instructions 822, 824, 826, 828 and 830 to cause the processor 810 to perform actions according to example implementations of the present disclosure.

As shown in FIG. 8, the memory 820 stores instructions 822 to obtain a reference inclination value and a reference intensity value of a magnetic field intensity based on a location of the AP. The memory 820 further stores instructions 824 to obtain, using a magnetometer and an accelerometer of the AP, an inclination value, and an intensity value of the magnetic field intensity associated with the AP. The memory 820 further stores instructions 826 to determine a first difference between the reference inclination value and the inclination value associated with the AP, and a second difference between the reference intensity value and the intensity value associated with the AP. The memory 820 further stores instructions 828 to determine that the first difference exceeds a first threshold or the second difference exceeds a second threshold. The memory 820 further stores instructions 830 to detect, based on the first difference exceeding the first threshold or the second difference exceeding the second threshold, a distortion for at least one of the inclination value and the intensity value. The stored instructions and the functions that the instructions may perform can be understood with reference to the description of FIGS. 2-7. For the purpose of simplification, the details of instructions 822, 824, 826, 828 and 830 will not be discussed herein.

It is to be understood that similar to FIG. 6 or FIG. 7, the AP performing the aforementioned instructions 822, 824, 826, 828, and 830 can improve the accuracy of the detection of the magnetic distortion, and can save the cost for detecting the magnetic distortion. In some example, the AP can correct the azimuth of the antenna to achieve a better transmission performance.

Program codes or instructions for carrying out methods of the present disclosure may be written in any combination of one or more programming languages. These program codes or instructions may be provided to a processor or controller of a general-purpose computer, special-purpose computer, or other programmable data processing apparatus, such that the program codes, when executed by the processor or controller, cause the functions/operations specified in the flowcharts and/or block diagrams to be implemented. The program code or instructions may execute entirely on a machine, partly on the machine, as a stand-alone software package, partly on the machine and partly on a remote machine, or entirely on the remote machine or server.

Program codes or instructions for carrying out methods of the present disclosure may be written in any combination of one or more programming languages. These program codes or instructions may be provided to a processor or controller of a general-purpose computer, special-purpose computer, or other programmable data processing apparatus, such that the program codes, when executed by the processor or controller, cause the functions/operations specified in the flowcharts and/or block diagrams to be implemented. The program code or instructions may execute entirely on a machine, partly on the machine, as a stand-alone software package, partly on the machine and partly on a remote machine, or entirely on the remote machine or server.

In the context of this disclosure, a machine-readable medium may be any tangible medium that may contain or store a program for use by or in connection with an instruction execution system, apparatus, or device. The machine-readable medium may be a machine-readable signal medium or a machine-readable storage medium. A machine-readable medium may include but is not limited to an electronic, magnetic, optical, electromagnetic, infrared, or semiconductor system, apparatus, device, or any suitable combination of the foregoing. More specific examples of the machine-readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order or that all illustrated operations be performed to achieve desirable results. In certain circumstances, multitasking and parallel processing may be advantageous. Certain features that are described in the context of separate implementations may also be implemented in combination in a single implementation. Conversely, various features that are described in the context of a single implementation may also be implemented in multiple implementations separately or in any suitable sub-combination.

In the foregoing Detailed Description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure.

What is claimed is:

1. A method comprising:

obtaining, by the AP, a location of the AP from a global navigation satellite system (GNSS) sensor in the event that the AP is outdoor; or obtaining, by the AP, the location of the AP from a location service provider in the event that the AP is indoor;

obtaining, by an access point (AP), a reference inclination value and a reference intensity value of a magnetic field intensity based on the location of the AP;

obtaining, by the AP and using a magnetometer and an accelerometer of the AP, an inclination value and an intensity value of the magnetic field intensity associated with the AP;

determining, by the AP, a first difference between the reference inclination value and the inclination value associated with the AP, and a second difference between the reference intensity value and the intensity value associated with the AP;

determining, by the AP, that the first difference exceeds a first threshold or the second difference exceeds a second threshold; and detecting, by the AP and based on the first difference exceeding the first threshold or the second difference exceeding the second threshold, a distortion for at least one of the inclination value and the intensity value.

2. The method of claim 1, wherein obtaining the reference inclination value and the reference intensity value comprises:

determining, based on a current date on which the inclination value and the intensity value is obtained, a table of an international geomagnetic reference field (IGRF) corresponding to the current date; and determining, based on the table of the IGRF, an inclination value and an intensity value corresponding to the location of the AP as the reference inclination value and the inclination value.

3. The method of claim 1, wherein the magnetometer and the accelerometer is mounted in the AP, or the AP comprises a smart antenna module (SMA) which is capable to output the inclination value and the intensity value.

4. The method of claim 1, further comprising:

determining, by the AP and based on the first difference not exceeding the first threshold and the second difference not exceeding the second threshold, no distortion for the inclination value and the intensity value.

5. The method of claim 1, further comprising:

reporting, by the AP, the distortion for the at least one of the inclination value and the intensity value to a user device.

6. The method of claim 1, further comprising:

based on the detection of the distortion, determining, by the AP, whether the AP has been moved before the detection of the distortion; and based on determining that the AP has not been moved before the detection of the distortion, determining to correct a current azimuth of an antenna of the AP.

7. The method of claim 6, wherein determining, by the AP, whether the AP has been moved before the detection of the distortion comprises:

obtaining, by the AP, an acceleration value associated with the AP which is collected before the detection of the distortion from the accelerometer;

obtaining, by the AP, a reference acceleration associated with the AP;

determining, by the AP, whether the acceleration value is greater than the reference acceleration value;

based on determining that the acceleration value is greater than the reference acceleration value, determining that the AP has been moved before the detection of the distortion; and based on determining that the acceleration value is less than the reference acceleration value, determining that the AP has not been moved before the detection of the distortion.

8. The method of claim 6, wherein correcting the current azimuth of the antenna of the AP comprises:

preventing, by the AP, from using the current azimuth; and using, by the AP, a previous azimuth determined in the event that no distortion is detected.

9. The method of claim 6, further comprising:

based on determining that the AP has been moved before the detection of the distortion, determining to use the current azimuth of the antenna of the AP.

10. An access point (AP) comprising:

at least one processor; and a memory coupled to the at least one processor, the memory storing instructions to cause the at least one processor to:

obtain a location of the AP from a global navigation satellite system (GNSS) sensor in the event that the AP is outdoor; or obtain the location of the AP from a location service provider in the event that the AP is indoor;

obtain a reference inclination value and a reference intensity value of a magnetic field intensity based on the location of the AP;

obtain, using a magnetometer and an accelerometer of the AP, an inclination value and an intensity value of the magnetic field intensity associated with the AP;

determine a first difference between the reference inclination value and the inclination value associated with the AP, and a second difference between the reference intensity value and the intensity value associated with the AP;

determine that the first difference exceeds a first threshold or the second difference exceeds a second threshold; and detect, based on the first difference exceeding the first threshold or the second difference exceeding the second threshold, a distortion for at least one of the inclination value and the intensity value.

11. The AP of claim 10, wherein the instructions to obtain the reference inclination value and the reference intensity value comprise instructions to cause the at least one processor to:

determine, based on a current date on which the inclination value and the intensity value is obtained, a table of an international geomagnetic reference field (IGRF) corresponding to the current date; and determine, based on the table of the IGRF, an inclination value and an intensity value corresponding to the location of the AP as the reference inclination value and the inclination value.

12. The AP of claim 10, wherein the magnetometer and the accelerometer is mounted in the AP, or the AP comprises a smart antenna module (SMA) which is capable to output the inclination value and the intensity value.

13. The AP of claim 10, further comprising instructions to cause the at least one processor to:

report, by the AP, the distortion for the at least one of the inclination value and the intensity value to a user device; or determine, based on the first difference not exceeding the first threshold and the second difference not exceeding the second threshold, no distortion for the inclination value and the intensity value.

14. The AP of claim 10, further comprising instructions to cause the at least one processor to:

based on the detection of the distortion, determine whether the AP has been moved before the detection of the distortion; and based on determining that the AP has not been moved before the detection of the distortion, determine to correct a current azimuth of an antenna of the AP.

15. The AP of claim 14, wherein the instructions to determine whether the AP has been moved before the detection of the distortion comprise instructions to cause the at least one processor to:

obtain an acceleration value associated with the AP which is collected before the detection of the distortion from the accelerometer;

obtain a reference acceleration associated with the AP;

determine whether the acceleration value is greater than the reference acceleration value;

based on determining that the acceleration value is greater than the reference acceleration value, determine that the AP has been moved before the detection of the distortion; and based on determining that the acceleration value is less than the reference acceleration value, determine that the AP has not been moved before the detection of the distortion.

16. The AP of claim 14, wherein the instructions to correct the current azimuth of the antenna of the AP comprise instructions to cause the at least one processor to:

prevent from using the current azimuth; and use a previous azimuth determined in the event that no distortion is detected.

17. The AP of claim 14, further comprising instructions to cause the at least one processor to:

based on determining that the AP has been moved before the detection of the distortion, determine to use the current azimuth of the antenna of the AP.

18. A non-transitory computer-readable medium comprising instructions stored thereon which, when executed by an access point (AP), cause the AP to:

obtain a location of the AP from a global navigation satellite system (GNSS) sensor in the event that the AP is outdoor; or obtain the location of the AP from a location service provider in the event that the AP is indoor;

obtain a reference inclination value and a reference intensity value of a magnetic field intensity based on the location of the AP;

obtain, using a magnetometer and an accelerometer of the AP, an inclination value and an intensity value of the magnetic field intensity associated with the AP;

determine a first difference between the reference inclination value and the inclination value associated with the AP, and a second difference between the reference intensity value and the intensity value associated with the AP;

determine that the first difference exceeds a first threshold or the second difference exceeds a second threshold; and detect, based on the first difference exceeding the first threshold or the second difference exceeding the second threshold, a distortion for at least one of the inclination value and the intensity value.

* * * * *